(12) United States Patent
Miosga et al.

(10) Patent No.: US 7,202,811 B2
(45) Date of Patent: Apr. 10, 2007

(54) RADAR SENSOR

(75) Inventors: Klaus-Dieter Miosga, Backnang (DE); Armin Himmelstoss, Weissach Im Tal (DE); Juergen Hildebrandt, Weilheim (DE); Joachim Hauk, Renningen-Malmsheim (DE); Michael Klar, Magstadt (DE); Thomas Binzer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/144,329

(22) Filed: Jun. 3, 2005

(65) Prior Publication Data

US 2005/0285776 A1 Dec. 29, 2005

(30) Foreign Application Priority Data

Jun. 25, 2004 (DE) .................. 10 2004 030 755

(51) Int. Cl.
*H01Q 3/26* (2006.01)
*G01S 3/04* (2006.01)
(52) U.S. Cl. ...................... 342/70; 342/372
(58) Field of Classification Search ............. 342/70, 342/372
See application file for complete search history.

(56) References Cited

U.S. PATENT DOCUMENTS

| | | | |
|---|---|---|---|
| 5,214,394 A * | 5/1993 | Wong ............... 373/700 MS |
| 5,504,493 A * | 4/1996 | Hirshfield ............. 342/372 |
| 5,940,030 A * | 8/1999 | Hampel et al. ......... 342/372 |
| 6,188,373 B1 * | 2/2001 | Martek ................ 342/375 |
| 6,336,033 B1 * | 1/2002 | Yamaguchi et al. ...... 455/273 |
| 6,545,647 B1 * | 4/2003 | Sievenpiper et al. .... 343/795 |
| 6,856,284 B1 * | 2/2005 | Cangiani .............. 342/372 |
| 2005/0128144 A1 * | 6/2005 | Himmelstoss et al. ............ 343/700 MS |
| 2006/0097916 A1 * | 5/2006 | Bogosanovic ....... 343/700 MS |

FOREIGN PATENT DOCUMENTS

| DE | 197 19 953 | 11/1998 |
|---|---|---|
| WO | 2004/015445 | 2/2004 |

\* cited by examiner

Primary Examiner—Ian J. Lobo
(74) Attorney, Agent, or Firm—Kenyon & Kenyon LLP

(57) ABSTRACT

A radar sensor emits microwave radiation and receives partial radiation reflected at objects within the sensor detection range, a plurality of antennas being provided for the transmission and reception in each case, and the transmission power of the outer antennas being lower than the transmission power of the inner antennas. This is accomplished by reducing the transmission power with the aid of couplers, the couplers advantageously being implementable as Wilkinson power splitters.

3 Claims, 3 Drawing Sheets

RADAR SENSOR

FIELD OF THE INVENTION

The present invention relates to a radar sensor which emits microwave radiation and receives partial radiation reflected at objects within the sensor detection range. In each case a plurality of antennas is provided for the transmission and reception, and the transmission power of the outer antennas is lower than the transmission power of the inner antennas. This is accomplished by reducing the transmission power with the aid of couplers. In an advantageous manner, the couplers may be implemented as Wilkinson power splitters.

BACKGROUND INFORMATION

In the publication "Adaptive Cruise Control ACC", published in April, 2002 (ISBN-3-7782-2034-9), the structure of a microwave sensor for distance and speed measurements for automotive applications is described in the chapter "Radar Modules" on pages 10 through 14. There, a high-frequency structure is shown by which transmission signals are forwarded to a patch antenna via a first ring coupler, and the received signals of the patch antenna are forwarded to a second mixer ring via the first ring coupler. The mixer ring also receives the transmit signals of the first ring hybrid, and the mixer ring generates an intermediate-frequency signal from the transmit signal and the receive signal with the aid of two mixer diodes, the intermediate-frequency signal being analyzed by a downstream signal processor for the automatic longitudinal control of a motor vehicle.

SUMMARY OF THE INVENTION

Since the microwave transmitter and receiver devices for automotive applications become increasingly smaller due to greater miniaturization and their housing dimensions are likewise preferred ever smaller for the most practical installation at the vehicle front, the disadvantage results that the dielectric lenses arranged in the optical path of the described patch antennas must become increasingly smaller, with the result that the receive/transmit characteristics of the sensor become broader than useful for a safe and reliable vehicle guidance. Consequently, a core of the present invention is to provide a device by which it is possible to realize a radar sensor whose radiation pattern, made up of a plurality of partial beams, may be highly bundled despite very small dimensions of the overall sensor.

In an advantageous manner, the transmission power of the outer antennas is reduced relative to the transmission power of the inner antennas, using couplers.

Furthermore, it is advantageous that the couplers for reducing the transmission power are designed as Wilkinson power splitters.

In addition, it is advantageous that the power loss of the output received by the antennas and output at the intermediate-frequency outputs is essentially the same for all receive channels.

Furthermore, it is advantageous that the antennas are designed as patch antennas.

In an advantageous manner, a dielectric lens is provided in front of the antenna elements to parallelize and bundle the transmit and receive radiation.

The same antennas are advantageously used to send and transmit.

Furthermore, it is advantageous that four transmit and receive channels are provided, the transmission power of the two outer channels being reduced over the transmission power of the two inner channels.

Moreover, it is advantageous that the radar sensor is able to be utilized in a motor vehicle for adaptive distance and speed control.

DETAILED DESCRIPTION

Figure 1:
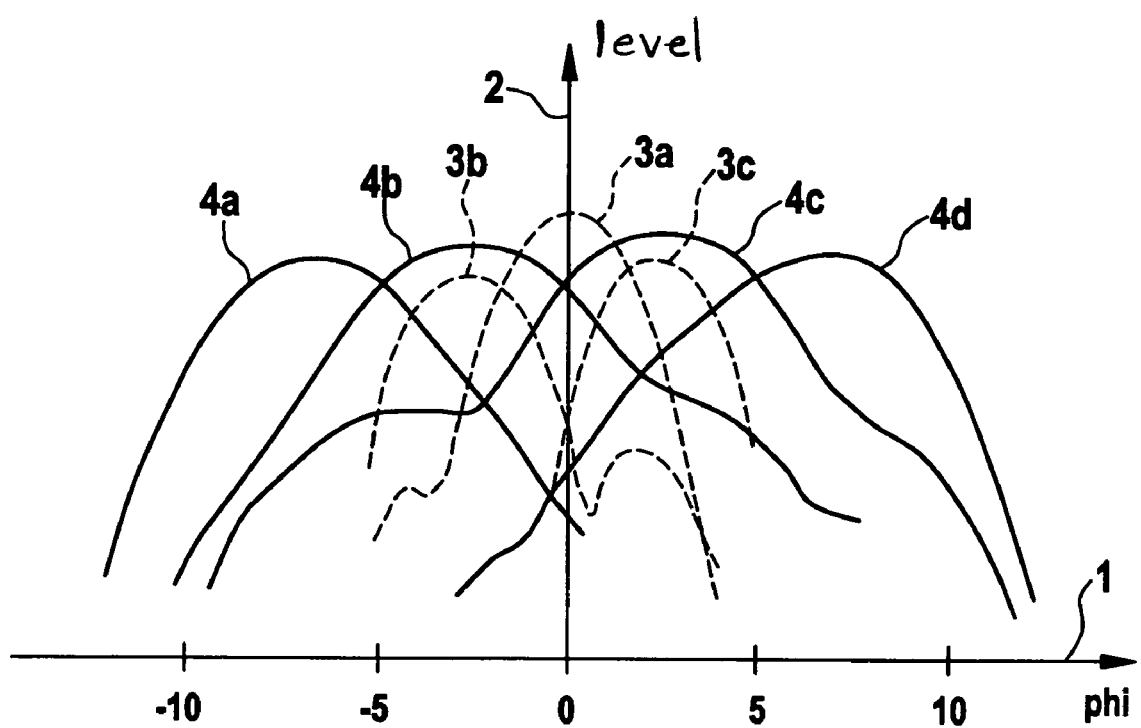
FIG. 1 shows an antenna diagram illustrating the receive characteristics of a radar sensor having the device according to the present invention and a radar sensor without the device according to the present invention.

FIG. 1 shows the transmit and receive diagram of two radar sensors. Azimuth angle phi of the radar sensor is plotted on abscissa 1, and the voltage level of the individual receive channels of the sensors is illustrated on the ordinate. A first radar sensor, which is configured without the device according to the present invention, is indicated by the three curves 3a, 3b and 3c, which are drawn in as dashed lines. This radar sensor is a three-beam radar sensor which has a dielectric lens to focus and parallelize the microwave radiation, the lens having a comparatively large diameter of 75 mm, for instance. This dielectric lens parallelizes and focuses the microwave radiation of the three patch antennas, one individual antenna being provided for each transmit and receive channel. Furthermore, FIG. 1 shows the transmit and receive diagram of an additional radar sensor which, for one, has four channels, i.e., four transmit and receive antennas are present which may preferably be implemented as patch antennas. Furthermore, this four-beam sensor is smaller in size, so that, for instance, the dielectric lens by which the transmit and receive radiation is parallelized and focused, is only 50 mm in diameter, for example, with the result that the individual beams of the individual antennas become very broad. Since this makes it possible to detect objects that have strong receive-signal levels and are located on an adjacent traffic lane or at the edge of the road, these targets are often superposed, so that relevant target objects, too, may be covered by irrelevant objects. The device according to the present invention thus intends to make the radiation pattern of the radar sensor more narrow despite the dielectric lens having a smaller diameter.

Figure 2:
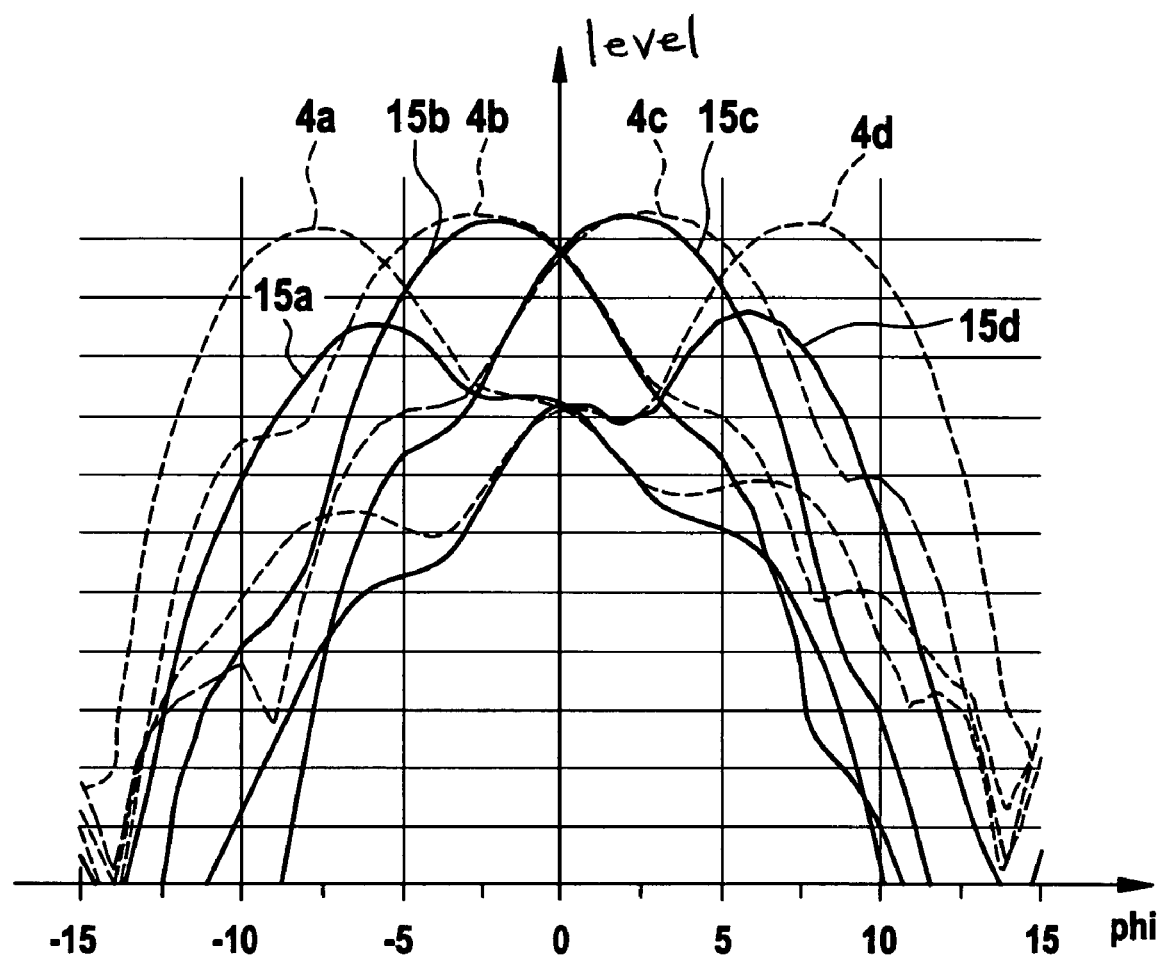
FIG. 2 shows an antenna diagram illustrating the receive characteristics of a four-beam radar sensor having the device according to the present invention and a four-beam radar sensor without the device according to the present invention.
Figure 3:
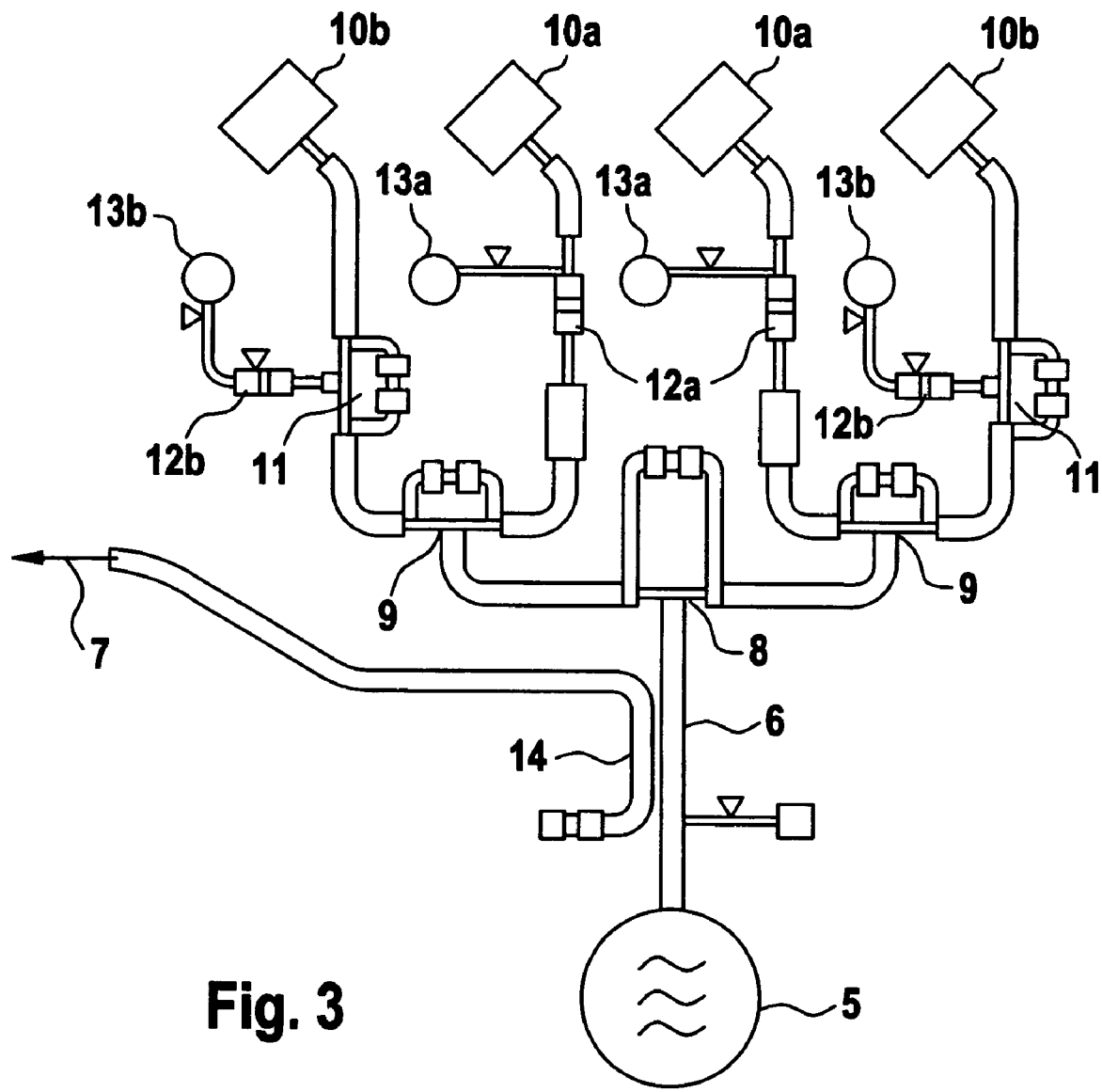
FIG. 3 shows a circuit arrangement of an exemplary embodiment of the device according to the present invention.

In FIG. 2, the receive characteristics of two four-beam radar sensors have been plotted. As in FIG. 1 as well, azimuth angle phi of the radar sensor has been plotted on the abscissa. The ordinate shows the level of the receive channels of the sensors as a function of azimuth angle phi. The four-beam radar sensor in which all four channels transmit at the same power and all channels have the same receive characteristic, is indicated by curves 4a through 4d whose maximum values all have essentially the same voltage level. Also shown is the receive characteristic of the four-beam radar sensor having the device according to the present invention, the two outer antennas transmitting at lower power than the two inner antennas. This receive characteristic is indicated by curves 15a through 15d in which the two outer curves 15a and 15d have a significantly lower receive level than the two inner channels 15b and 15c. The lowering of the receive characteristic of the outer channels avoids overradiation of the dielectric lens that is part of the radar sensor, so that a radiation pattern is obtained that is mainly aligned with the own traffic lane. The device shown in FIG. 3 where the high-frequency circuit of a four-beam radar sensor is illustrated, is suitable for this purpose. Shown is a microwave source 5 where the desired transmit frequency is generated and additionally modulated in the transmit frequency, for instance. Microwave source 5 couples the transmit signals onto a microstrip structure to which they are guided by way of feed line 6. In addition, feed line 6 may have a line coupler 14 by which a portion of the transmission power is decoupled and fed to a monitor line 7 which forwards it to a frequency control where the transmit frequency of microwave oscillator 5 is analyzed, and it is possible to control microwave source 5 in a regulating manner. The main portion of the transmission power of feed line 6 is guided to a 3 dB power splitter 8 where the transmission power is split approximately equally between two lines. These two capacities (lines) lead to two additional 3 dB power splitters 9 where the transmission power is once again divided roughly equally among the four transmit and receive channels. The individual transmit and receive channels have antennas 10 for this purpose by which the microwave radiation is able to be emitted and reflected partial radiation is able to be received, and which are advantageously designed as patch antennas. In an advantageous manner, these patch antennas may be arrayed along a horizontally aligned line in order to detect the azimuth angle of objects located in front.

In the case of the inner transmit and receive channels, mixer diodes 12A are connected in series between the 3 dB power splitters and patch antennas 10a, the mixer diodes having no real influence on the transmit behavior. In the receive case, these mixer diodes 12a are used as mixers because of their non-linear characteristic and a bias voltage as a result of the transmission output, so that the receive signal is mixed with the transmit signal, and an intermediate-frequency output signal that represents a mixed product from transmit and receive signal is able to be picked off at intermediate-frequency outputs 13a. Since the two outer transmit and receive channels are to be reduced in their transmission power so as to achieve a narrow transmit and receive characteristic, the present invention provides one Wilkinson splitter in each case between 3 dB power splitters 9 and patch antennas 10b of the outer two channels, which is switched such that the transmission power provided by 3 dB power splitter 9 is largely output to mixer diodes 12b and only a small portion of the transmission power is output to outer patch antennas 10b for transmission purposes. The transmission received by outer patch antennas 10b is in turn forwarded to Wilkinson splitter 11, which in turn sends the largest portion of the transmission to mixer diodes 12b and allows only the smallest portion of the transmission to flow back to 3 dB power splitter 9. In the transmission case, this makes it possible for the outer two antenna channels to transmit at lower transmission power than the two transmission channel in the middle, but in the receive case, the outer two transmission channels have approximately the same transmission level as the two inner receive channels.

Also provided at Wilkinson splitters 11 present in the outer two channels is one mixer diode 12b in each case, which, by superpositioning of the transmit and receive signal and by their non-linearity, implement a demodulation and make available an intermediate-frequency signal at intermediate-frequency outputs 13b. This prevents bundling from taking place already between the patch antennas and the lens, with the result that the lens is not fully illuminated in its width, so that the two middle transmit and receive diagrams are reduced in their width.

What is claimed is:

1. A radar sensor which emits microwave radiation and receives partial radiation reflected at objects within a sensor detection range, the radar sensor comprising:

a plurality of antennas for transmitting and receiving, the plurality of antennas including outer antennas and inner antennas, a transmission power of the outer antennas being lower than a transmission power of the inner antennas;

a dielectric lens situated in front of the antennas to parallelize and bundle transmit and receive radiation; and couplers for reducing the transmission power of the outer antennas compared to the transmission power of the inner antennas, wherein:

the couplers include Wilkinson power splitters, a power loss of an output received by the antennas and output at intermediate-frequency outputs is substantially the same for all receive channels, the antennas are patch antennas, the same antennas are used for transmitting and receiving, the Wilkinson power splitters are provided in supply lines to the outer antennas at a branching of the intermediate frequency outputs in such a way that two symmetrical connections of the Wilkinson power splitters are connected to the outer antennas and to a transmitted signal source, and a nonsymmetrical connection of the Wilkinson power splitters is connected to mixer diodes.

2. The radar sensor according to claim 1, wherein four transmit and receive channels are provided, a transmission power of two outer channels being reduced over a transmission power of two inner channels.

3. The radar sensor according to claim 1, wherein the radar sensor is utilized in a motor vehicle for adaptive distance and speed control.

* * * * *